Oct. 23, 1956 — R. W. SCHONOVER — 2,768,323
MEANS FOR INCREASING THE AREA OF GOOD
DEFINITION IN A P. P. I. DISPLAY
Filed April 18, 1955

INVENTOR.
ROBERT W. SCHONOVER
BY James S. Shannon
Wade Koontz
AGENT and ATTORNEY

2,768,323

MEANS FOR INCREASING THE AREA OF GOOD DEFINITION IN A P. P. I. DISPLAY

Robert W. Schonover, Dayton, Ohio, assignor to the United States of America as represented by the Secretary of the Air Force Application April 18, 1955, Serial No. 502,259

3 Claims. (Cl. 315—22)

(Granted under Title 35, U. S. Code (1952), sec. 266)

The invention described herein may be manufactured and used by or for the United States Government for governmental purposes without payment to me of any royalty thereon.

In the plan position indicator or P. P. I. type of radar display the scanning beam sweeps radially from the center toward the edge of the cathode ray tube screen and at the same time rotates in azimuth in synchronism with the rotating antenna. The separation between adjacent sweeps depends upon the transmitted pulse repetition frequency and speed of rotation of the antenna, and is a determining factor in the degree of definition obtainable in the image produced on the screen of the cathode ray tube. If the parameters are so chosen that optimum sweep separation occurs, for example, in a band midway between the center and the outer edge of the screen, then the definition will decrease toward the center of the screen due to increasing interference between adjacent sweeps and will decrease toward the outer edge of the screen due to increasing separation of adjacent sweeps.

It is the object of this invention to increase the area on the P. P. I. screen over which adjacent sweep separations lie within the minimum and maximum limits for good definition. Briefly this is accomplished by dividing the cathode ray tube screen into a number of concentric circular bands with each band having a greater number of sweeps than the next adjacent band toward the center of the screen. In this way a sufficient number of sweeps can be employed to provide good definition in the outer band without causing interference between sweeps and a resulting loss in definition in the inner bands.

A more detailed description of the invention will be given in connection with the specific embodiments thereof shown in the accompanying drawings, in which Figs. 1a, 1b and 1c show an embodiment in which the screen is divided into two bands; and Figs. 2a, 2b and 2c show another embodiment in which the screen is divided into three bands.

Fig. 1a shows a sector of the sweep pattern on the screen 10 of a cathode ray tube used as a P. P. I. indicator. The beam sweeps from the center C to the outer edge of the screen in the interval of time T. By blanking alternate sweeps for an interval T/2, measured from the start of the sweep, two concentric bands are formed on the screen with the outer band having twice the number of sweeps of the inner band. It will be apparent from this figure that, as compared with a conventional P. P. I. sweep pattern, the area over which the sweep separations fall within the acceptable limits for good definition has been increased.

Fig. 1b shows in block form a simple circuit for producing the pattern of Fig. 1a, and Fig. 1c shows the waveforms occurring in this circuit. Synchronizing pulses, which are obtained from the radar set and are coincident with the transmitted radar pulses and also with the sweep starting times, are applied to scalar 11 for division by two. The synchronizing pulses and the scalar output pulses are shown in Fig. 1c at 1 and 2, respectively. The scalar output pulses are applied to blanking pulse generating circuit 12 which is triggered by each pulse to produce the positive blanking pulses shown in Fig. 1c at 3. These pulses, which have a duration of T/2, are applied to the cathode of the cathode ray tube indicator 13 and serve to blank the electron beam during the first half of alternate sweeps.

Figure 1A:
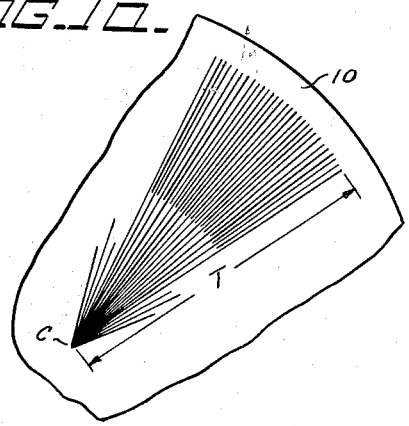
Figure 2A:
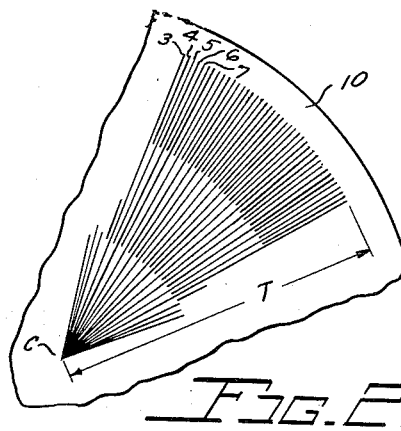
Fig. 2a illustrates an extension of the above described process to provide three bands on the cathode ray tube screen 10, the middle band having twice the number of sweeps of the inner circular area and one-half the number of sweeps in the outer band. This pattern increases still further the area over which adjacent sweep separations fall within acceptable limits for good definition.
Figure 1B:
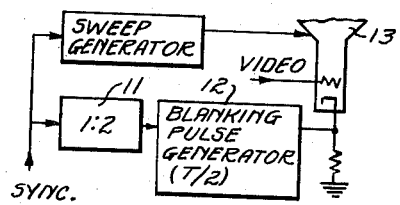

and the second a pulse of duration T/3. Due to the 1:2 scalar 16 generator 14 is triggered on the even numbered synchronizing pulse whereas the delay network 17, having a delay equal to the synchronizing pulse repetition interval, and 1:4 scalar 18 cause generator 15 to be triggered on alternate odd numbered synchronizing pulses. This is illustrated in the waveforms of Fig. 2c wherein 1 represents the first thirteen synchronizing pulses, 2 represents the output of scalar 16, 3 represents the output of pulse generator 14, 4 represents the output of scalar 18 and 5 represents the output of pulse generator 15. It may be seen from Fig. 2c that during the sweeps corresponding to the 2nd, 4th, 6th, 8th, etc., synchronizing pulses the beam is blanked for the interval $$\frac{2T}{3}$$

that during the sweeps corresponding to the 3rd, 7th, 11th, etc., pulses the beam is unblanked for the entire sweep, and that during the sweeps corresponding to the 5th, 9th, 13th, etc., synchronizing pulses the beam is blanked for the interval T/3. This produces the sweep pattern of Fig. 2a, five of the sweeps of this pattern being numbered 3–7 to correspond to the associated synchronizing pulses 3–7 in Fig. 2c. The first synchronizing pulse to occur, numbered 1 in Fig. 2c, produces an unblanked sweep which is not in accordance with the pattern; however, starting with the second pulse the pattern is followed.

Figure 2B:
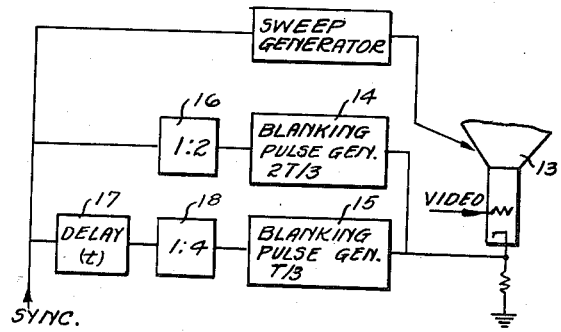
Fig. 2b shows in block form a circuit for producing the sweep pattern of Fig. 2a. In this circuit two blanking pulse generators 14 and 15 are used, the first producing a pulse of duration $$\frac{2T}{3}$$
Figure 1C:
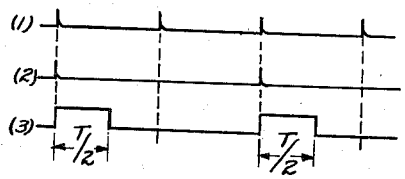
Figure 2C:
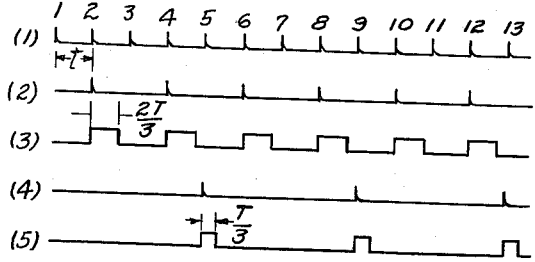

The procedures illustrated in Fig. 2b may be extended to provide more than three bands on the cathode ray tube screen if desired.

I claim:

1. In combination with a cathode-ray tube indicator of the type in which the electron beam of the tube sweeps periodically in a radial direction from the center of the screen of the tube outward and at the same time rotates at constant speed about the center of said screen, means synchronized with said sweeps and operative, except during every nth sweep, where n is a positive integer greater than unity, to blank the beam during a portion of the sweep starting at the center of said screen.

2. In combination with a cathode ray tube indicator of the type in which the electron beam of the tube sweeps periodically in a radial direction from the center of the screen of the tube outward and at the same time rotates at constant speed about the center of said screen, means synchronized with said sweeps and operative only during alternate sweep for blanking the beam during a fixed portion of the sweep beginning at the center of said screen.

3. In combination wth a cathode ray tube indicator of the type in which the electron beam of the tube sweeps periodically in a radial direction from the center of the screen of the tube outward and at the same time rotates at constant speed about the center of said screen, means synchronized with said sweeps and operative during even numbered sweeps for blanking the beam during a fixed portion of the sweep beginning at the center of said screen and operative during alternate odd numbered sweeps to blank said beam during a fixed portion of the sweep less than the aforementioned fixed portion and beginning at the center of said screne.

References Cited in the file of this patent

UNITED STATES PATENTS

| | | |
|---|---|---|
| 2,416,199 | Nagel | Feb. 18, 1947 |
| 2,416,200 | Nagel | Feb. 18, 1947 |
| 2,501,110 | Walker | Mar. 21, 1950 |